(12) United States Patent
Anderson et al.

(10) Patent No.: US 8,734,604 B2
(45) Date of Patent: *May 27, 2014

(54) BOND LINE CONTROL PROCESS

(75) Inventors: David M. Anderson, Sammamish, WA (US); Michael W. Evens, Burien, WA (US)

(73) Assignee: The Boeing Company, Chicago, IL (US)

(*) Notice: Subject to any disclaimer, the term of this patent is extended or adjusted under 35 U.S.C. 154(b) by 83 days.

This patent is subject to a terminal disclaimer.

(21) Appl. No.: 12/328,903

(22) Filed: Dec. 5, 2008

(65) Prior Publication Data
US 2010/0143722 A1 Jun. 10, 2010

(51) Int. Cl.
*B29C 65/00* (2006.01)

(52) U.S. Cl.
USPC .......................................... 156/94

(58) Field of Classification Search
None
See application file for complete search history.

(56) References Cited

U.S. PATENT DOCUMENTS

| | | | |
|---|---|---|---|
| 1,881,651 A | 10/1932 | Judge | |
| 2,795,854 A | 6/1957 | Perkal | |
| 3,046,670 A | 7/1962 | Wydra | |
| 3,389,474 A | 6/1968 | Linn | |
| 3,924,529 A * | 12/1975 | Atkinson | 101/123 |
| 4,874,648 A | 10/1989 | Hill et al. | |
| 5,023,987 A | 6/1991 | Wuepper et al. | |
| 5,214,307 A | 5/1993 | Davis | |
| 5,232,962 A | 8/1993 | Dershem et al. | |
| 5,269,861 A | 12/1993 | Gilbreath | |
| 5,620,768 A | 4/1997 | Hoffmann, Sr. | |
| 5,833,795 A * | 11/1998 | Smith et al. | 156/272.4 |
| 5,865,397 A | 2/1999 | Herrmann | |
| 5,925,204 A | 7/1999 | Hoffmann, Sr. | |
| 5,958,166 A | 9/1999 | Walters et al. | |
| 6,073,577 A * | 6/2000 | Lilleland et al. | 118/723 E |
| 6,124,016 A | 9/2000 | Weil | |
| 6,286,224 B1 | 9/2001 | Lewis | |
| 6,472,758 B1 | 10/2002 | Glenn et al. | |
| 6,889,442 B2 | 5/2005 | Bouvier | |
| 6,904,690 B2 | 6/2005 | Bakke et al. | |
| 7,229,683 B2 * | 6/2007 | Fischer et al. | 428/293.7 |
| 7,306,851 B2 | 12/2007 | Panse | |
| 7,350,311 B2 | 4/2008 | Marks | |
| 7,495,862 B2 | 2/2009 | Flores et al. | |

(Continued)

FOREIGN PATENT DOCUMENTS

| | | |
|---|---|---|
| DE | 29709179 U1 | 7/1997 |
| GB | 154193 A | 7/1921 |

(Continued)

OTHER PUBLICATIONS

International Search Report, dated Feb. 6, 2012, regarding Application No. PCT/US2011/053402 (WO2012060944), 6 pages.

(Continued)

*Primary Examiner* — Barbara J Musser
(74) *Attorney, Agent, or Firm* — Yee & Associates, P.C.

(57) ABSTRACT

A method and apparatus for bonding parts. An adhesive and a plurality of beads may be applied onto a first surface of a first part to form a layer of adhesive and beads. The first surface of the first part with the layer of adhesive and beads may be placed in contact with a second surface of a second part to form a structure, wherein the structure may be cured.

11 Claims, 8 Drawing Sheets

(56) References Cited

U.S. PATENT DOCUMENTS

| | | | |
|---|---|---|---|
| 7,575,778 | B2 | 8/2009 | Su et al. |
| 7,686,905 | B2 * | 3/2010 | Ackerman et al. ............... 156/94 |
| 8,109,312 | B2 | 2/2012 | Schober |
| 2003/0005995 | A1 | 1/2003 | Miller |
| 2004/0113483 | A1 * | 6/2004 | Sylvester et al. .......... 301/37.11 |
| 2004/0187331 | A1 | 9/2004 | Bouvier |
| 2005/0022923 | A1 | 2/2005 | Korchnak et al. |
| 2005/0051360 | A1 * | 3/2005 | Su et al. ........................ 174/260 |
| 2005/0112968 | A1 | 5/2005 | Panse |
| 2005/0272142 | A1 * | 12/2005 | Horita ........................ 435/287.1 |
| 2006/0176611 | A1 | 8/2006 | Flores et al. |
| 2007/0095457 | A1 * | 5/2007 | Keller et al. .................... 156/94 |
| 2007/0281122 | A1 | 12/2007 | Blanchard et al. |
| 2009/0139638 | A1 | 6/2009 | Flores et al. |
| 2009/0165928 | A1 | 7/2009 | Schober |
| 2010/0276064 | A1 | 11/2010 | Blanchard et al. |
| 2010/0276065 | A1 | 11/2010 | Blanchard et al. |
| 2012/0111478 | A1 | 5/2012 | Akdeniz et al. |
| 2012/0137532 | A1 | 6/2012 | Yeh |

FOREIGN PATENT DOCUMENTS

| | | |
|---|---|---|
| GB | 746331 A | 3/1956 |
| GB | 2155637 A | 9/1985 |
| WO | 2009080038 A1 | 7/2009 |
| WO | 2011028355 A1 | 3/2011 |
| WO | 2012060944 A1 | 5/2012 |

OTHER PUBLICATIONS

Greene, "Chpater Five: Fabrication—Repair," In: Marine Composites, Eric Greene Associates, Inc., Annapolis, MD, Jul. 1999, pp. 285-299.

USPTO Final Office Action, dated Jun. 22, 2011, regarding U.S. Appl. No. 12/613,810, 16 pages.

Response to Final Office Action, dated Oct. 21, 2011, regarding U.S. Appl. No. 12/613,810, 31 pages.

International Search Report, dated Nov. 22, 2010, regarding Application No. PCT/US2010/044423 (WO2011028355), 3 pages.

USPTO Office Action, dated Jan. 13, 2011, regarding U.S. Appl. No. 12/554,554, 14 pages.

Response to Office Action, dated Apr. 7, 2011, regarding U.S. Appl. No. 12/554,554, 21 pages.

USPTO Office Action, dated Jun. 30, 2011, regarding U.S. Appl. No. 12/554,554, 11 pages.

Response to Office Action, dated Sep. 30, 2011, regarding U.S. Appl. No. 12/554,554, 22 pages.

USPTO Office Action, dated Jan. 13, 2011, regarding U.S. Appl. No. 12/613,810, 17 pages.

Response to Office Action, dated Apr. 19, 2011, regarding U.S. Appl. No. 12/613,810, 27 pages.

Notice of Allowance, dated Feb. 25, 2013, regarding U.S. Appl. No. 12/939,485, 5 pages.

Office Action, dated Nov. 2, 2012, regarding U.S. Appl. No. 12/939,485, 19 pages.

Notice of Allowance, dated Oct. 21, 2013, regarding USPTO U.S Appl. No. 13/897,526, 17 pages.

* cited by examiner

BOND LINE CONTROL PROCESS

BACKGROUND INFORMATION

1. Field

The present disclosure relates generally to manufacturing and, in particular, to a method and apparatus for bonding parts to each other. Still more particularly, the present disclosure relates to a method and apparatus for controlling a thickness of an adhesive used to bond parts to each other.

2. Background

Aircraft are being designed and manufactured with greater and greater percentages of composite materials. Some aircraft may have more than fifty percent of their primary structure made from composite materials. Composite materials may be used in aircraft to decrease the weight of the aircraft. This decreased weight may improve payload capacities and fuel efficiencies. Further, composite materials may provide longer service life for various components in an aircraft.

Composite materials may be tough, light-weight materials created by combining two or more dissimilar components. For example, without limitation, a composite may include fibers and resins. The fibers and resins may be combined to form a cured composite material.

In manufacturing aircraft with composite materials and/or other materials, adhesives may be used to create structural bonds between parts.

When an aircraft is in service, maintenance may be performed on an aircraft in which repairs may be made to various parts. These repairs may include, for example, without limitation, repairs to a composite skin panel. A patch may be applied to a portion of a composite skin panel that may require a repair. In applying the patch, an adhesive may be placed onto the patch and/or skin panel. The patch may then be placed on the skin panel, and curing of the adhesive may be performed to create a structural bond between the patch and the composite skin panel.

Current processes for applying an adhesive may involve an operator applying the adhesive to the patch and/or composite skin panel. The operator may then sweep and/or spread the adhesive with a tool having a flat side. This type of process may be time consuming because of a desire to obtain an even layer of adhesive. This layer of adhesive may also be referred to as a bond line. Depending upon the location of the patch, this process may be more difficult. For example, without limitation, if the adhesive is to be applied to the underside of an aircraft, spreading the adhesive may become more difficult and/or challenging.

If the layer of adhesive is uneven, the structural bond may not have load limits that meet desired levels. As a result, the patch may not last. Another challenge, in addition to having an even layer of adhesive, is to have an adhesive layer that has a desired thickness. If the thickness of the adhesive layer is too thin, the structural bond created may not be as desired. In a similar fashion, if the layer of adhesive is too thick, the structural bond may not be as desired. This situation may require the patch to be reapplied in order to obtain a desired level of structural bonding. Consequently, the structural bonding may not meet desired levels if the layer of adhesive is uneven, too thin, and/or too thick.

Therefore, it would be advantageous to have a method and apparatus that overcomes one or more of the issues discussed above.

SUMMARY

In one advantageous embodiment, a method may be present for bonding parts. An adhesive and a plurality of beads may be applied onto a first surface of a first part to form a layer of adhesive and beads. The first surface of the first part with the layer of adhesive and beads may be placed in contact with a second surface of a second part to form a structure, wherein the structure may be cured.

In another advantageous embodiment, a method may be present for bonding composite parts. An adhesive and a plurality of beads may be applied onto a first surface of a skin panel to form a layer of adhesive and beads by placing a mask onto the first surface of the skin panel, placing a screen onto the mask to form an exposed area on the first surface of the skin panel, and applying the adhesive and the plurality of beads onto the first surface of the skin panel through the exposed area of the screen; placing the screen onto the first surface of the skin panel and spreading the adhesive with the plurality of beads onto the first surface of the skin panel through the screen; and placing the screen onto the first surface of the skin panel, spreading the adhesive onto the first surface of the skin panel through the screen, and spreading the plurality of beads onto the first surface of the skin panel through the screen. The screen may have a thickness, and the plurality of beads may have a size that causes a substantially uniform thickness for the layer of adhesive and beads when applied to the first surface of the skin panel. The plurality of beads may be a plurality of spheres and may be comprised of a material selected from one of glass, ceramic, metal, and rubber. The adhesive may be applied onto a patch through the screen. The first surface of the skin panel with the layer of adhesive and beads may be placed in contact with a second surface of the patch to form a structure. A caul plate may be placed on the structure prior to curing the structure. The structure may be cured. The skin panel may be comprised of a material selected from one of a composite material, a metal, aluminum, and titanium.

In another advantageous embodiment, a method may be present for bonding parts. An adhesive and a plurality of beads may be applied onto a first surface of a first part to form a layer of adhesive and beads. A screen may be imbedded into the layer of adhesive and beads. Excessive adhesive may be removed from a top of the screen to form a substantially uniform layer of adhesive and beads. The screen may be removed from the substantially uniform layer of adhesive and beads. The first surface of the first part with the substantially uniform layer of adhesive and beads may be placed in contact with a second surface of a second part to form a structure. The structure may then be cured In an advantageous embodiment, a method may be present for bonding parts. An adhesive and a plurality of beads may be applied onto a first surface of a first part through a screen to form a layer of adhesive and beads. The first surface of the first part with the layer of adhesive and beads and the screen may be placed in contact with a second surface of a second part to form a structure. The structure may then be cured.

In a further advantageous embodiment, a method may be present for bonding parts. An adhesive may be applied onto a first surface of a first part through a screen to form a layer of adhesive. The first surface of the first part with the layer of adhesive may be placed in contact with a second surface of a second part to form a structure. The structure may then be cured.

In yet another advantageous embodiment, an apparatus may comprise a first part having a first surface, a second part having a second surface, a layer of adhesive, and a plurality of beads. The layer of adhesive and the plurality of beads may be in contact with the first surface of the first part and the second surface of the second part.

In a further advantageous embodiment, a structure may comprise a first composite part having a first surface, a second composite part having a second surface, a layer of adhesive, and a plurality of beads. The layer of adhesive and the plurality of beads may be in contact with the first surface of the first composite part and the second surface of the second composite part. The layer of adhesive may be cured to form a structural bond between the first composite part and the second composite part.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
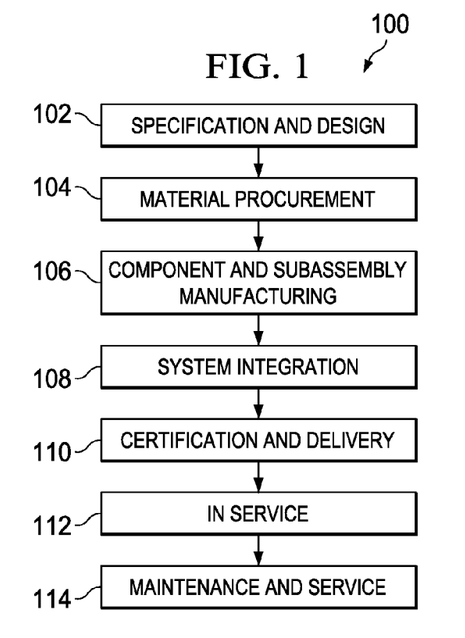
FIG. 1 is a diagram illustrating an aircraft manufacturing and service method in accordance with an advantageous embodiment.
Figure 2:
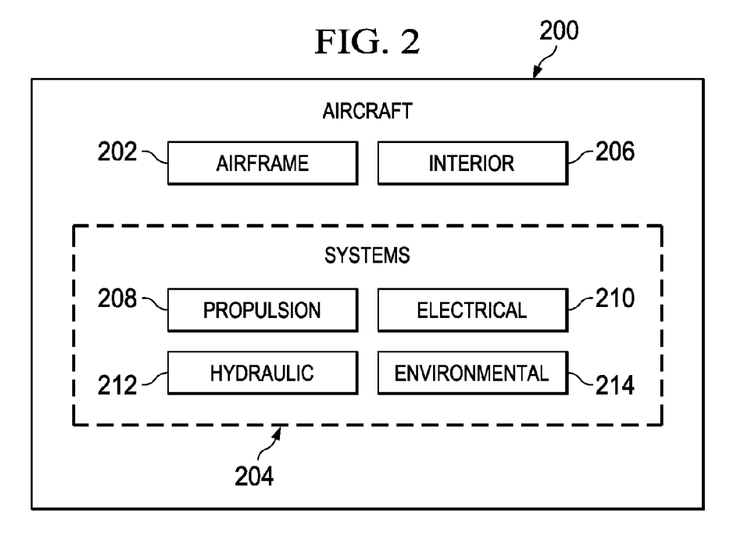
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, without limitation, advantageous embodiments may be used to join parts for aircraft 200 during component and subassembly manufacturing 106 and/or system integration 108 of aircraft 200. Additionally, advantageous embodiments may be employed during maintenance and service 114 to perform reconfigurations and/or repairs of aircraft 200.

The different advantageous embodiments recognize and take into account that current processes for applying adhesive may not result in an even layer of adhesive being applied to an area in which bonding is to be performed. The different advantageous embodiments also recognize and take into account that the current processes may not provide a desired thickness for the adhesive layer even if the adhesive can be applied to form an even layer.

Thus, the different advantageous embodiments provide a method and apparatus for bonding parts. An adhesive and a plurality of beads are applied onto a surface of a first part through a screen to form a layer of adhesive beads. The surface of the first part with the layer of adhesive beads is placed into contact with the surface of the second part to form an adhesive layer containing beads to form a structure. The structure may then be cured.

In these examples, the screen may have a thickness, and applying the adhesive and the plurality of beads onto a first surface of the first part through the screen may result in the layer of adhesive and beads having substantially the thickness of the screen.

The plurality of beads may have a size capable of causing a substantially uniform thickness for the layer of adhesive and beads when applied to the first surface of the part. The beads may be capable of maintaining the substantially uniform thickness for the layer of adhesive when joining parts together. Pressure applied to one or more parts being joined may not result in an uneven thickness. Further, the size of the beads may maintain the thickness under pressure.

Figure 3:
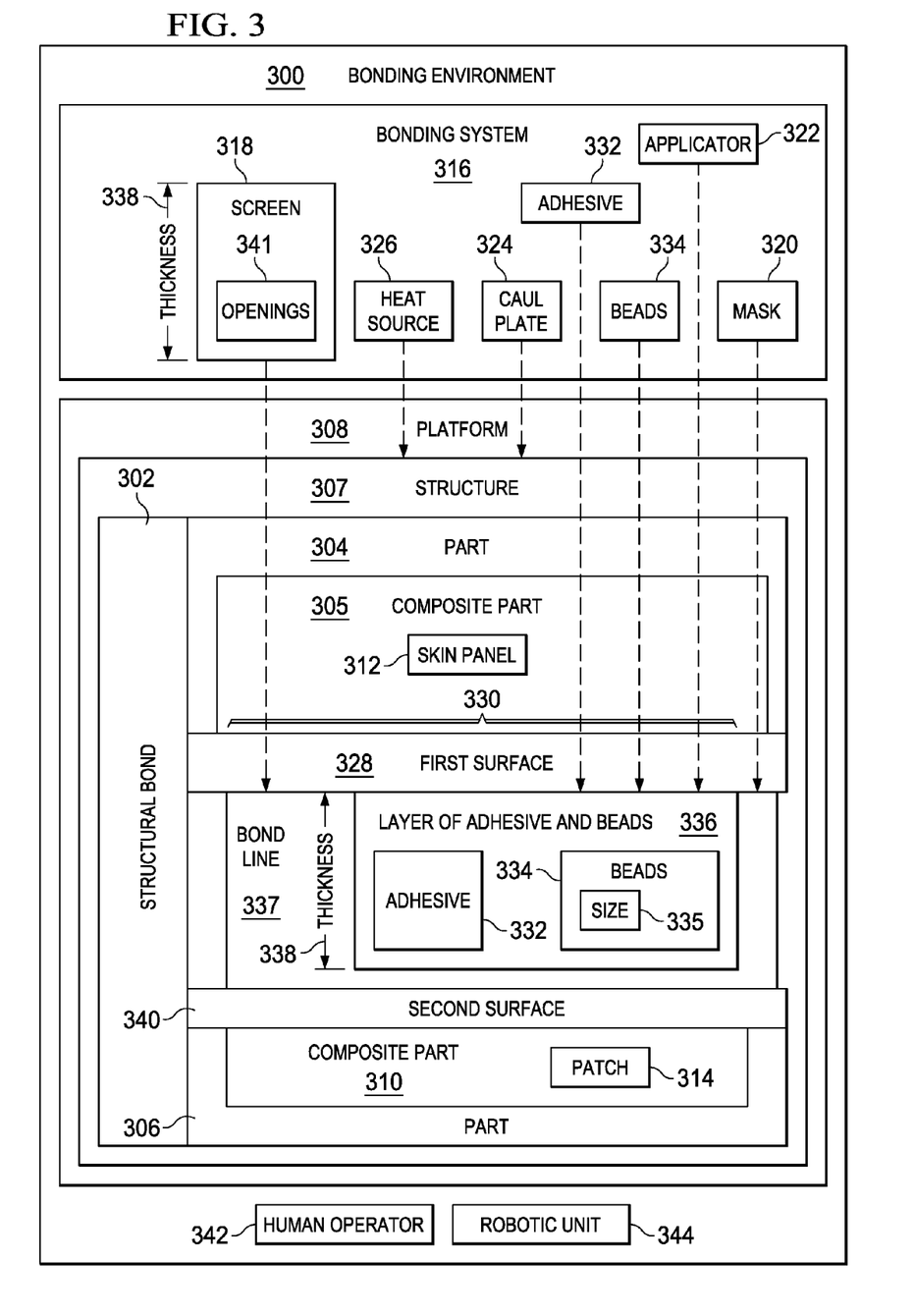
FIG. 3 is a diagram of a bonding environment in accordance with an advantageous embodiment.

With reference now to FIG. 3, a diagram of a bonding environment is depicted in accordance with an advantageous embodiment. In this illustrative example, bonding environment 300 may be used to create structural bond 302 between part 304 and part 306. Part 304 and part 306 may form structure 307. In these examples, part 304 and part 306 may be parts for platform 308. In these examples, platform 308 may be, for example, aircraft 200 in FIG. 2. Part 304 may take the form of composite part 305, and part 306 may take the form of composite part 310.

In these illustrative examples, composite part 305 may be skin panel 312, although other structures such as, and without limitation, floor panels, walls, frames, stringers, spars, doors, and other structures are contemplated. Composite part 310 may be patch 314. Part 304 and part 306 may be bonded to each other using bonding system 316. Bonding system 316 may include screen 318, mask 320, applicator 322, caul plate 324, and heat source 326.

Mask 320 may be placed onto first surface 328 of composite part 305 to expose area 330. Screen 318 may then be placed onto mask 320. Adhesive 332 and beads 334 may be applied onto first surface 328 in area 330 through screen 318 to form layer of adhesive and beads 336. Layer of adhesive and beads 336, when cured, may take the form of bond line 337.

Adhesive 332 and beads 334 may be applied in a number of different ways. For example, adhesive 332 may be mixed with beads 334 and applied together to form a layer of adhesive and beads 336. In other advantageous embodiments, adhesive 332 may be applied through openings 341 in screen 318. Openings 341 may have various shapes and sizes depending on the particular implementation.

Openings 341 may have a size capable of allow beads 334 to pass through openings 341. Screen 318 also may have other parameters, such as, for example, without limitation, a screen weave, an opening between threads, a thread diameter, and/or other suitable parameters. These parameters may interact with bead size and adhesive properties, such as thickness, tackiness, surface tension, viscosity, and/or other adhesive properties.

Thereafter, beads 334 may be added to adhesive 332 on first surface 328 in area 330 to form layer of adhesive and beads 336. In these examples, screen 318 may have thickness 338, which may be substantially uniform. As a result, layer of adhesive and beads 336 also may substantially have thickness 338.

Some small excess amount of adhesive 332 with thickness 338 prior to joining, greater than the diameter of beads 334 may be applied to reduce and/or eliminate potential air gaps that may occur during joining of composite part 305 and composite part 310. During joining of part 305 and part 310 parts may be under vacuum bag pressure or other pressure to squeeze out excess adhesive while maintaining a uniform bond line with thickness 332 very near a diameter of beads 334. This ensures adequate fill occurs above all surface area. Applying screen 318 and subsequent spreading process may avoid layer of adhesive and beads 336 from having thickness 338 that may result in a bond line that may be thicker than desired and weaker than desired.

Applicator 322 may be used to apply adhesive 332 and/or beads 334 through screen 318 onto first surface 328 of composite part 305. Applicator 322 may remove excess adhesive 332 and/or beads 334 from screen 318 to form layer of adhesive and beads 336 having substantially thickness 338.

After layer of adhesive and beads 336 has been formed, screen 318 and mask 320 may be removed. Second surface 340 of composite part 310 may be placed in contact with first surface 328 of composite part 305. Beads 334 within layer of adhesive and beads 336 may maintain layer of adhesive and beads 336 with substantially thickness 338. Beads 334 may provide a structural element that may maintain thickness 338 at substantially the same level. Without beads 334 in layer of adhesive and beads 336, thickness 338 may become uneven in portions of area 330.

In the different advantageous embodiments, adhesive 332 may be selected from any adhesive that may be suitable for creating structural bond 302 between part 304 and part 306. In the different advantageous embodiments, adhesive 332 may have a viscosity such that when screen 318 is removed from the layer of adhesive and beads 336, the layer of adhesive and beads 336 may maintain substantially thickness 338.

In one advantageous embodiment, adhesive 332 may be selected to have the viscosity, tackiness, and surface tension in its uncured state to allow an appropriate level of flow to occur when screen 318 is removed. Adhesive 332 with or without beads 334 may be selected to stick to first surface 328, while maintaining a flow that will allow adhesive 332 to remain on the structure and reflow slightly after screen 318 is removed. Part of the selection of adhesive 332 takes into account the working time of adhesive 332 so the properties may be maintained during the application of adhesive 332 and the joining of first surface 328 of composite part 305 and second surface 340 of composite part 310.

Adhesive 332 may vary depending on the materials for part 304 and part 306. For example, without limitation, when part 304 and part 306 takes the form of composite part 305 and composite part 310, adhesive 332 may be an adhesive suitable for composite components.

If composite part 305 and/or composite part 310 take the form of a metal or aluminum part, a different type of adhesive may be suitable. The particular adhesive selected may depend on the material of the parts being bonded to each other, the strength of the bond desired, and other suitable factors. Adhesives that may be used include, for example, without limitation, epoxy adhesives, urethane adhesives, acrylic adhesives, and other suitable adhesives.

Beads 334 may have size 335. Size 335 may be selected based on thickness 338 or some other desired thickness. Size 355 of beads 334 may be around thickness 338. Further, an amount of beads 334 within layer of adhesive and beads 336 may vary depending on the particular implementation. Beads 334 may be comprised of a material selected from at least one of glass, metal, ceramic, rubber, and/or some other suitable material. Beads 334 may be substantially incompressible in these examples.

This incompressibility may be desirable to avoid reducing thickness 338. As used herein, the phrase "at least one of", when used with a list of items, means that different combinations of one or more of the items may be used and only one of each item in the list may be needed. For example, "at least one of item A, item B, and item C" may include, without limitation, item A or item A and item B. This example also may include item A, item B, and item C, or item B and item C.

Structure 307 may be cured to create structural bond 302. In these examples, the curing may be performed for layer of adhesive and beads 336 to form structural bond 302 between part 304 and part 306. Curing of structure 307 may be performed using heat source 326. Heat source 326 may be, for example, without limitation, a heat pad, an autoclave, or some other suitable heat source. In some advantageous embodiments, caul plate 324 may be placed onto structure 307 for the curing process. In these examples, the different operations performed using bonding system 316 may be performed manually by human operator 342 and/or automatically by robotic unit 344.

The illustration of bonding environment 300 in FIG. 3 is not meant to imply physical or architectural limitations to the manner in which different advantageous embodiments may be implemented. In some advantageous embodiments, other components may be used in addition to, or in place of, the ones illustrated. In yet other advantageous embodiments, some components may be unnecessary.

For example, in some advantageous embodiments, the use of caul plate 324 may be unnecessary during the curing process. In yet other advantageous embodiments, vent holes may be formed in composite part 310 when composite part 310 takes the form of a patch. Vent holes may help squeeze out air trapped within layer of adhesive and beads 336. In yet other advantageous embodiments, structure 307 may be bagged for the curing process. Bagging may help to compress the bond line to the minimum thickness allowed by beads 334.

As another illustrative example, in some advantageous embodiments, screen 318 may be placed onto first surface 328 with mask 320 being placed over screen 318. In yet other advantageous embodiments, mask 320 may be unnecessary. In still other advantageous embodiments, adhesive 332 also may be placed on second surface 340 of part 306. In still other illustrative examples, advantageous embodiments may place an activator on second surface 340 of part 306. An activator may cause adhesive 332 to enter a state in which adhesive 332 cures or can be cured.

Figure 4:
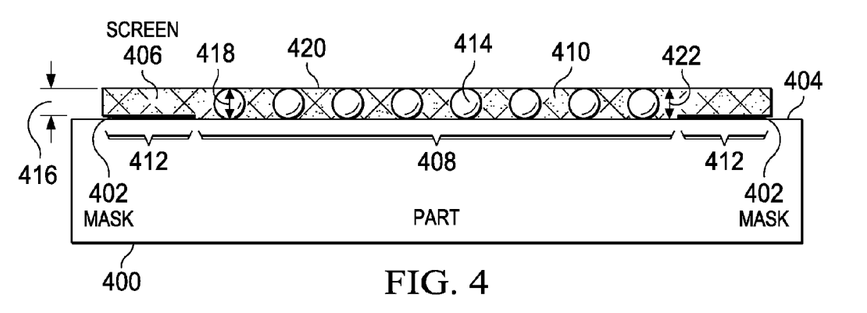
FIG. 4 is a diagram of a cross-sectional view of application of an adhesive in accordance with an advantageous embodiment.

With reference now to FIG. 4, a diagram of a cross-sectional view of an adhesive is depicted in accordance with an advantageous embodiment. In this example, part 400 is an example of part 304 in FIG. 3.

Part 400 may be, for example, without limitation, a skin panel or some other suitable part. Part 400 may be comprised of a material such as, for example, without limitation, a composite material, aluminum, titanium, and/or some other suitable material. In this example, mask 402 may be placed on surface 404 of part 400. Screen 406 may be placed onto mask 402. In these examples, mask 402 may expose area 408. Adhesive 410 may be applied onto surface 404 in area 408. Mask 402 may prevent adhesive 410 from being applied or deposited onto sections 412 on surface 404 outside of area 408. Beads 414 may be mixed with adhesive 410 or applied separately, depending on the particular implementation.

In these examples, screen 406 may have thickness 416. Beads 414 may have diameter 418. Diameter 418 may be substantially the same value as thickness 416 and may be substantially consistent between different beads in beads 414. With the use of screen 406, layer of adhesive and beads 420 may be applied to have thickness 422, which may be substantially the same thickness as thickness 416 in area 408. In other words, thickness 416 of screen 406 may set thickness 422 of layer of adhesive 410 and beads 420. Beads 420 may substantially maintain thickness 422 after screen 406 has been removed.

Figure 5:
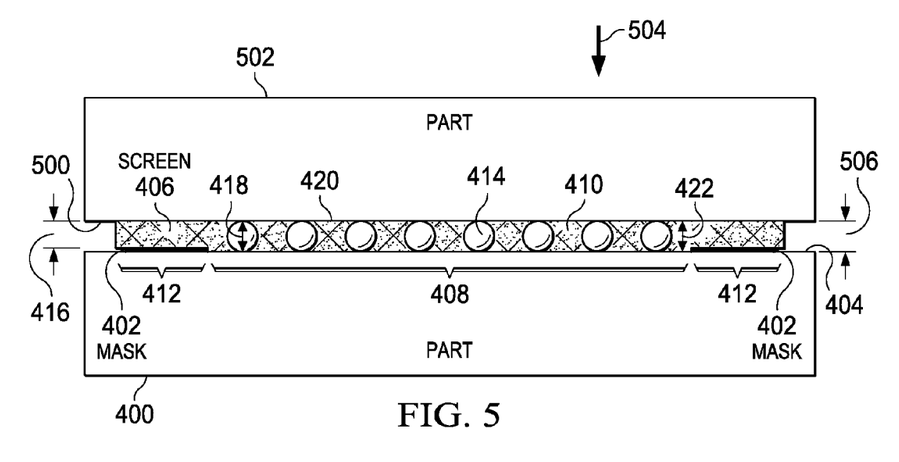
FIG. 5 is a diagram of a cross-sectional view of a structure with a layer of adhesive and beads in accordance with an advantageous embodiment.

Turning next to FIG. 5, a diagram of a cross-sectional view of a structure with a layer of adhesive and beads is depicted in accordance with an advantageous embodiment. In this illustrative example, surface 404 of part 400 may be placed into contact with surface 500 of part 502. Part 502 may be, for example, a patch or other repair piece for part 400.

In the different advantageous embodiments, force may be applied on part 502 in the direction of arrow 504. Beads 414 within layer of adhesive and beads 420 may reduce and/or prevent a reduction in thickness 422 beyond beads 414 thickness for layer of adhesive and beads 420. Further, beads 414 may prevent unevenness within thickness 422 in area 408 of layer of adhesive and beads 420. In these examples, beads 414 may be spherical in shape. Of course, any shape may be used, depending on the particular implementation. In these illustrative examples, any shape that may avoid stacking between beads 414 may be used for beads 414.

In some advantageous embodiments, thickness 422 may be greater than diameter 418. With this type of implementation, layer of adhesive and beads 420 may reduce in value to thickness 506 based on diameter 418 of beads 414.

Figure 6:
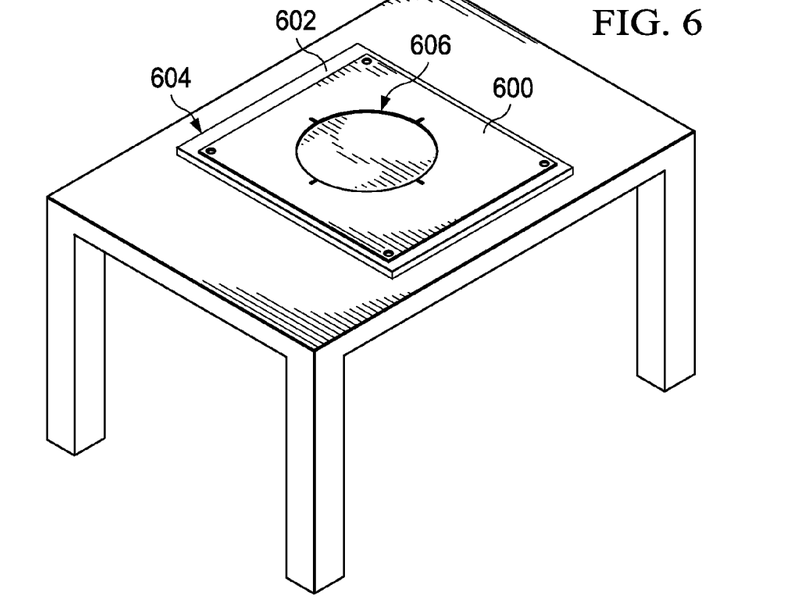
FIG. 6 is a diagram of a mask on a part in accordance with an advantageous embodiment.

With reference now to FIGS. 6-12, diagrams illustrating application of adhesive and beads to a part are depicted in accordance with an advantageous embodiment. FIG. 6 is a diagram of a mask on a part in accordance with an advantageous embodiment. With reference first to FIG. 6, mask 600 may be placed on surface 602 of part 604. Mask 600 may expose area 606 on surface 602. Area 606 may be an area on which adhesive may be applied.

Figure 7:
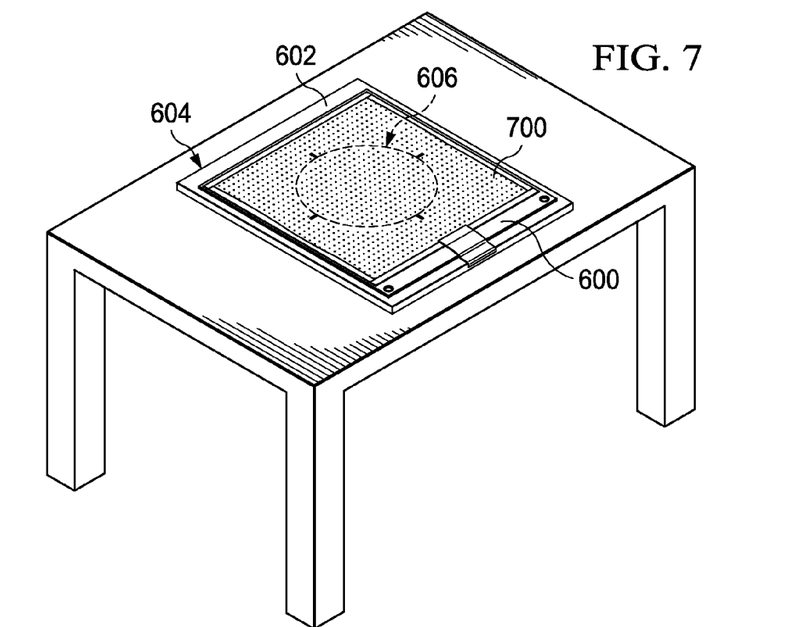
FIG. 7 is a diagram of a part being prepared for an adhesive in accordance with an advantageous embodiment.

With reference to FIG. 7, a diagram of a part being prepared for an adhesive is depicted in accordance with an advantageous embodiment. In this example, screen 700 has been placed over mask 600 on part 604. As a result, adhesive may only pass through screen 700 onto surface 602 in area 606 of part 604.

Figure 8:
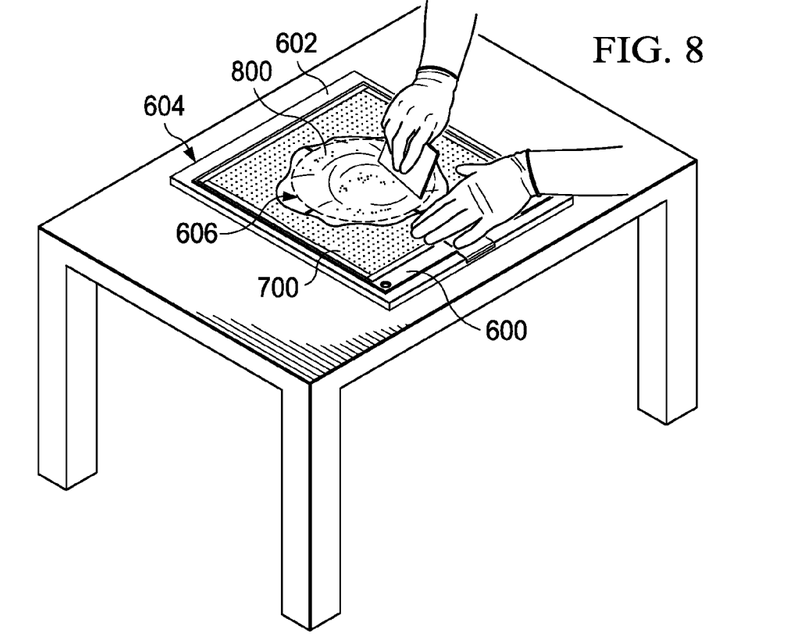
FIG. 8 is a diagram illustrating application of an adhesive and beads in accordance with an advantageous embodiment.

With reference now to FIG. 8, a diagram illustrating application of an adhesive and beads is depicted in accordance with an advantageous embodiment. In this example, adhesive and beads 800 may be applied to surface 602 through screen 700. Adhesive and beads 800 may only be applied to area 606 because of mask 600.

Figure 9:
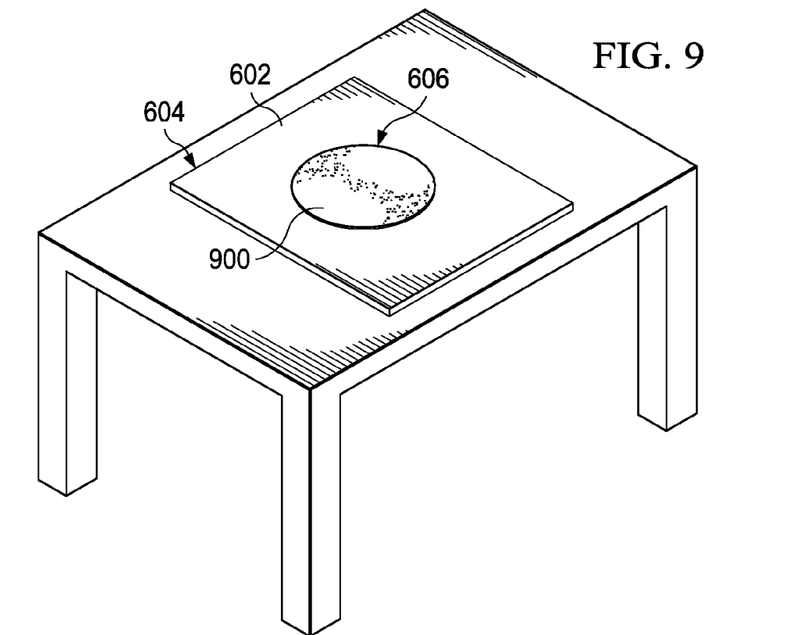
FIG. 9 is a diagram of a part with adhesive and beads in accordance with an advantageous embodiment.

In FIG. 9, a diagram of a part with adhesive and beads is depicted in accordance with an advantageous embodiment. In this example, layer of adhesive and beads 900 remains after removal of screen 700 (not shown) and mask 600 (not shown). Part 604 may now be ready for joining and/or bonding.

Figure 10:
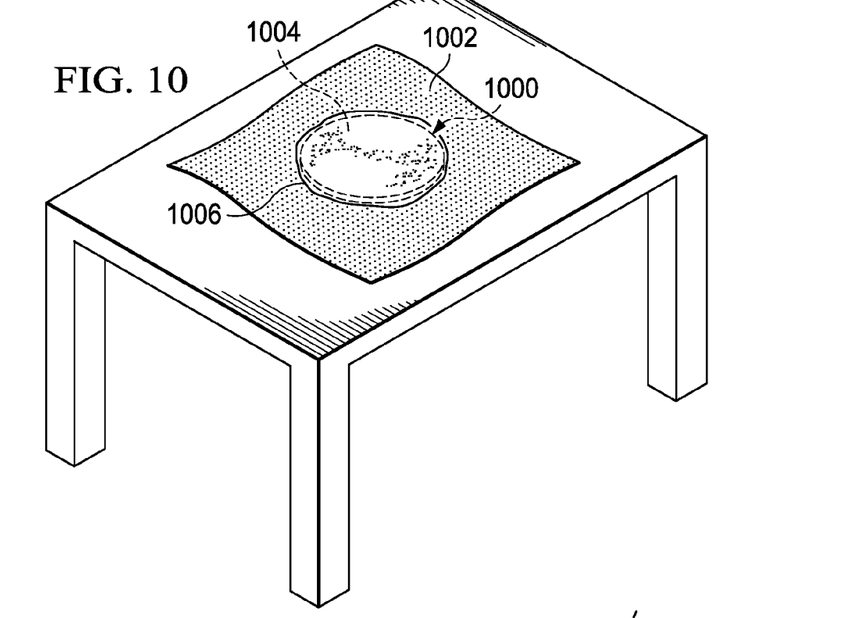
FIG. 10 is a diagram illustrating application of adhesive to a part in accordance with an advantageous embodiment.

With reference now to FIG. 10, a diagram illustrating application of adhesive to a part is depicted in accordance with an advantageous embodiment. In this example, part 1000 has screen 1002 placed on surface 1004. Adhesive 1006 may have been applied to surface 1004 through screen 1002. In this example, adhesive 1006 may not include beads.

Figure 11:
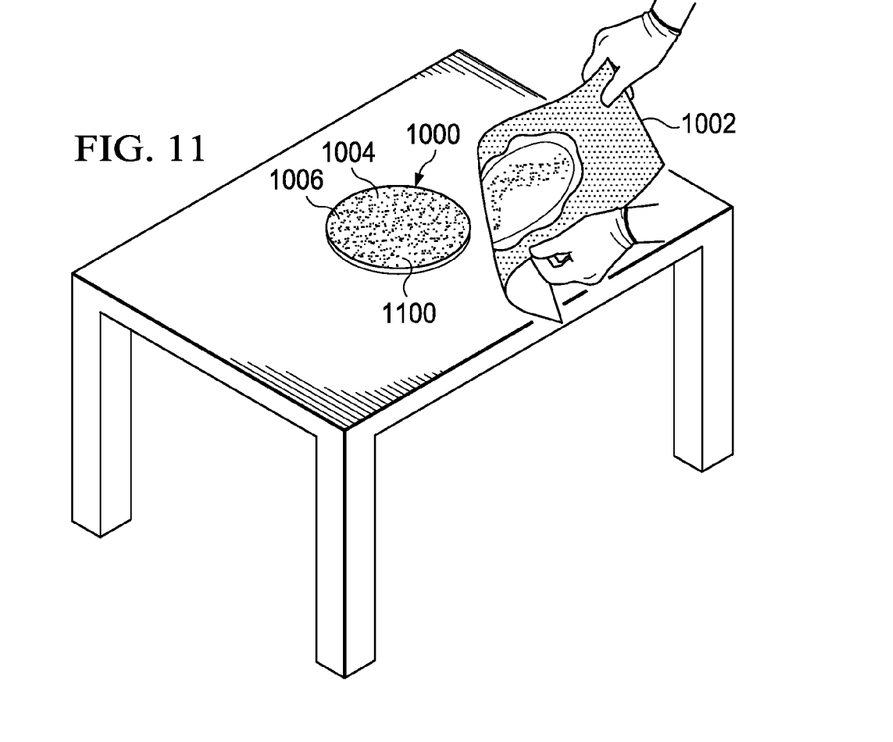
FIG. 11 is a diagram illustrating removal of a screen from a part with adhesive in accordance with an advantageous embodiment.

Turning to FIG. 11, a diagram illustrating removal of a screen from a part with adhesive is depicted in accordance with an advantageous embodiment. In this illustrative example, screen 1002 has been removed from part 1000. Adhesive layer 1100 remains on surface 1004. In some advantageous embodiments, adhesive layer 1100 may take the form of an activator.

Figure 12:
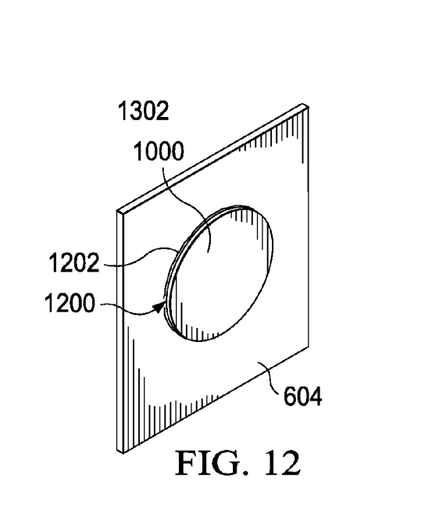
FIG. 12 is a diagram illustrating two parts bonded to each other in accordance with an advantageous embodiment.

With reference now to FIG. 12, a diagram illustrating two parts bonded to each other is depicted in accordance with an advantageous embodiment. In this example, part 1000 may be placed against part 604 and cured to form structural bond 1200 seen as bond line 1202. Part 1000 and part 604 may be cured using heat and application of pressure. The thickness or bond line may be consistent for structural bond 1200 in this example.

The different operations and features illustrated in FIGS. 6-12 are not meant to imply limitations to the manner in which different advantageous embodiments may be implemented. Some advantageous embodiments may have other features and/or operations in addition to, or in place of, the ones illustrated. Further, in some advantageous embodiments, some of the features and/or operations may be unnecessary. For example, in some advantageous embodiments, adhesive 1006 may be unnecessary for part 1000. In yet other advantageous embodiments, screen 700 may be placed onto surface 602 of part 604 with mask 600 being placed onto screen 700.

Figure 13:
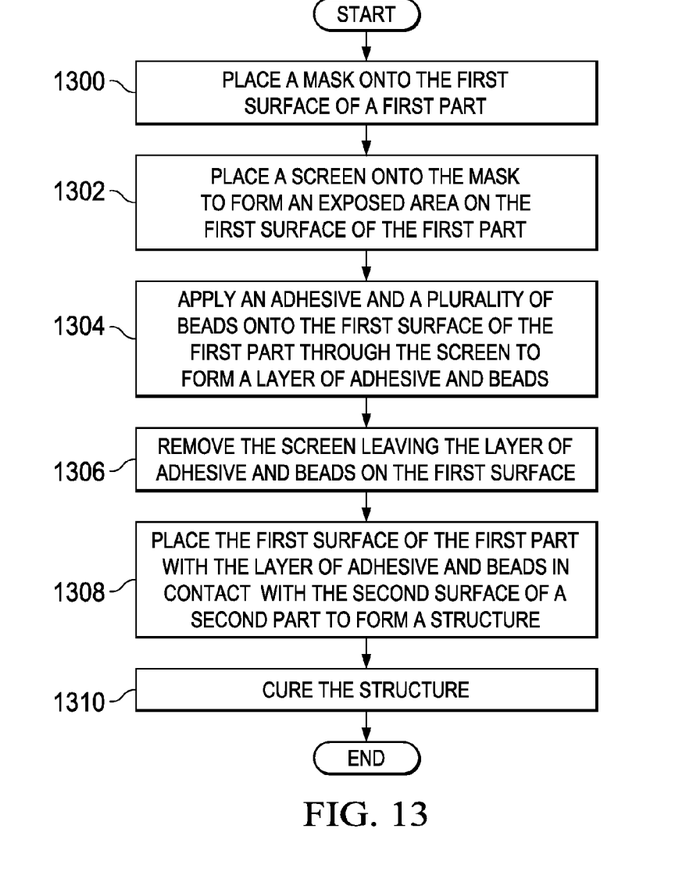
FIG. 13 is a flowchart of a process for bonding parts in accordance with an advantageous embodiment.

With reference now to FIG. 13, a flowchart of a process for bonding parts is depicted in accordance with an advantageous embodiment. The process illustrated in FIG. 13 may be implemented using a bonding environment such as, for example, bonding environment 300 in FIG. 3.

The process may begin by placing a mask onto the first surface of a first part (operation 1300). The process may then place a screen onto the mask to form an exposed area on the first surface of the first part (operation 1302). The process may then apply an adhesive and a plurality of beads onto the first surface of the first part through the screen to form a layer of adhesive and beads (operation 1304). The screen may be removed leaving the layer of adhesives and beads on the first surface of the first part (operation 1306).

The process may place the first surface of the first part with the layer of adhesive and beads in contact with the second surface of a second part to form a structure (operation 1308). The process may cure the structure (operation 1310), with the process terminating thereafter.

Figure 14:
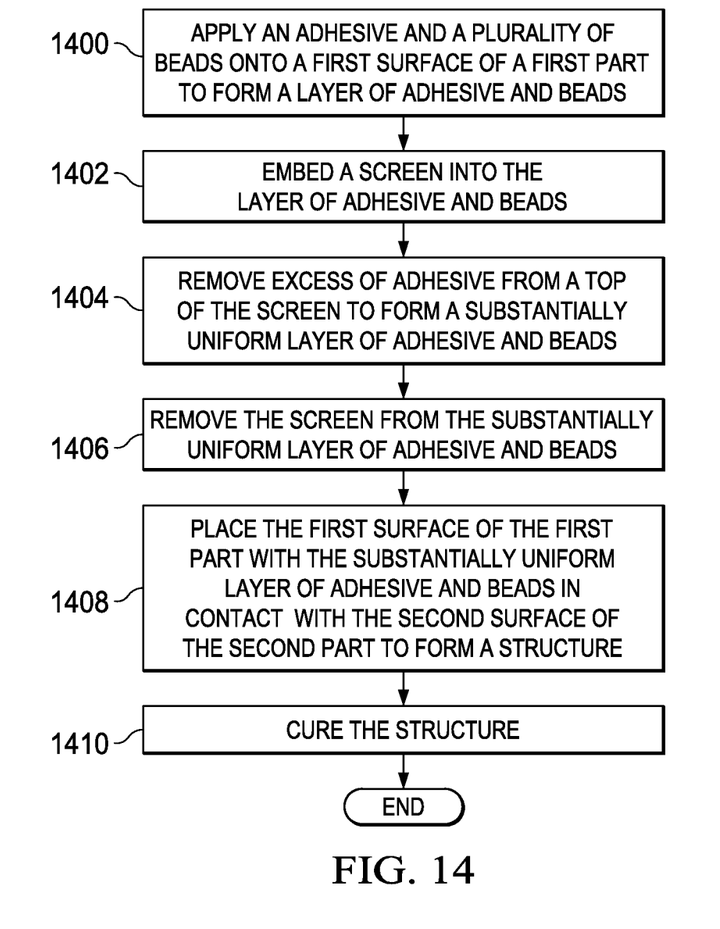
FIG. 14 is a flowchart of a process for bonding parts in accordance with an advantageous embodiment.

With reference now to FIG. 14, a flowchart of a process for bonding parts is depicted in accordance with an advantageous embodiment. The process illustrated in FIG. 14 may be implemented using a bonding environment such as, for example, bonding environment 300 in FIG. 3.

The process may begin by applying an adhesive and a plurality of beads onto a first surface of a first part to form a layer of adhesive and beads (operation 1400). The process may then embed a screen into the layer of adhesive and beads (operation 1402). Excess of adhesive may be removed from a top of the screen to form a substantially uniform layer of adhesive and beads (operation 1404). The screen may then be removed from the substantially uniform layer of adhesive and beads (operation 1406).

The first surface of the first part with the substantially uniform layer of adhesive and beads may be placed in contact with the second surface of a second part to form a structure (operation 1408). The process may then cure the structure (operation 1410), with the process terminating thereafter.

The process illustrated in the flowcharts in FIGS. 13 and 14 may be performed in a number of different ways. In some advantageous embodiments, other operations may be used in addition to, or in place of, the ones illustrated. Further, some operations may be performed simultaneously. In yet other advantageous embodiments, some operations may be omitted.

For example, operation 1306 may be omitted to leave the screen and beads in place when placing the first surface in contact with the second surface. In yet other advantageous embodiments, the layer of adhesive may be placed through the screen without beads and the screen left in place. For example, in some advantageous embodiments, adhesive also may be applied to the second surface of the second part.

In another example, the adhesive may not include beads. As another example, the application of the adhesive and the plurality of beads onto the first surface may be performed by applying a mixture of the adhesive and the plurality of beads. In other advantageous embodiments, the adhesive may be applied to the first surface. The beads may then be applied to the first surface through the screen.

Thus, the different advantageous embodiments provide a method and apparatus for bonding parts to each other. The different advantageous embodiments may provide a capability to create a layer of adhesive that may have a thickness that is around a substantially desired value. Further, the use of beads in the adhesive may maintain the layer of adhesive with the value for the desired thickness. Further, when pressure is applied to the parts, the layer of adhesive and beads may maintain a substantially uniform thickness throughout.

With one or more of the advantageous embodiments, repeatability may be provided in bonding parts. In the illustrative examples, repeatability may include, for example, without limitation, consistent structural bonds, consistent strength, consistent design, and certification margins as structural integrity of parts may be more predictable using different advantageous embodiments. These and possible other features may provide easier and quicker certification of parts and/or products.

The description of the different advantageous embodiments has been presented for purposes of illustration and description, and it is not intended to be exhaustive or limited to the embodiments in the form disclosed. Many modifications and variations will be apparent to those of ordinary skill in the art. Although the different advantageous embodiments have been described with respect to aircraft, other advantageous embodiments may be applied to other types of platforms.

For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object. For example, the different advantageous embodiments may be suitable for bonding wood parts for objects, such as a building, a boat, and/or some other object that includes wood parts.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for bonding parts, the method comprising:
applying an adhesive and a plurality of beads onto an area of a first surface of a first part through a screen to form a layer of adhesive and beads having a substantially uniform thickness over said area of said first surface, the plurality of beads each have a size that is about equal to said substantially uniform thickness;

following applying said adhesive layer with said substantially uniform thickness, placing the first surface of the first part with the layer of adhesive and beads in contact with a second surface of a second part to form a structure, said adhesive layer covering an entire area between said first surface and said second surface, the screen having the substantially uniform thickness, the adhesive and the plurality of beads being applied onto the first surface of the first part through the screen to form the layer of adhesive and beads, and the layer of adhesive and beads having substantially the thickness of the screen; and curing the structure.

2. The method of claim 1, wherein the beads maintain uniform thickness for the adhesive when joining the first surface of the first part with the second surface of the second part.

3. The method of claim 2 further comprising:

removing the screen before placing the first surface of the first part with the layer of adhesive and beads in contact with a second surface of the second part to form the structure.

4. The method of claim 1, wherein the plurality of beads maintains said substantially uniform thickness for the layer of adhesive and beads when applied to the first surface of the first part.

5. The method of claim 1, further comprising bagging the structure prior to curing.

6. The method of claim 1, wherein applying comprises:

placing a mask onto the first surface of the first part;

placing the screen onto the mask to form an exposed area on the first surface of the first part; and applying the adhesive and the plurality of beads onto the exposed area on the first surface of the first part through the screen.

7. The method of claim 1, wherein the adhesive is an adhesive paste.

8. The method of claim 1, wherein the plurality of beads is a plurality of spheres.

9. The method of claim 1, wherein the plurality of beads is comprised of a material selected from one of glass, ceramic, metal, and rubber.

10. The method of claim 1, wherein the first part is comprised of a material selected from one of a composite material, a metal, aluminum, and titanium.

11. The method of claim 1, wherein the first part is a skin panel, and the second part is a patch.

\* \* \* \* \*